(12) United States Patent
Andersson (10) Patent No.: US 9,145,075 B2
(45) Date of Patent: Sep. 29, 2015

(54) VEHICLE MODULAR ARMREST (75) Inventor: Christer Andersson, Trollhattan (SE)

(73) Assignee: Lear Corporation, Southfield, MI (US)

( * ) Notice: Subject to any disclaimer, the term of this patent is extended or adjusted under 35 U.S.C. 154(b) by 324 days.

(21) Appl. No.: 13/179,624

(22) Filed: Jul. 11, 2011

(65) Prior Publication Data

US 2012/0074741 A1    Mar. 29, 2012

Related U.S. Application Data (60) Provisional application No. 61/387,305, filed on Sep. 28, 2010.

(51) Int. Cl.
*B60N 2/46* (2006.01)
*B23P 11/00* (2006.01)
*B60N 3/10* (2006.01)
B29L 31/30 (2006.01)
B60R 7/04 (2006.01)

(52) U.S. Cl.
CPC B60N 2/46 (2013.01); B60N 2/468 (2013.01); B60N 2/4613 (2013.01); B60N 2/4626 (2013.01); B60N 3/101 (2013.01); *B23P 11/00* (2013.01); *B29L 2031/3026* (2013.01); *B60N 2/4606* (2013.01); *B60R 7/043* (2013.01); *Y10T 29/49826* (2015.01)

(58) Field of Classification Search
CPC .............. B29L 2031/3008; B29L 2031/3026; B60N 2/46–2/4653; B60N 2/468–2/4693; B60R 7/04; B60R 7/043; B23P 11/00; B23P 15/00; B23P 17/00

USPC .......... 296/24.34, 37.15, 193.04; 297/118.14, 297/118.18, 411.2, 440.22, 411.37
See application file for complete search history.

(56) References Cited

U.S. PATENT DOCUMENTS

| | | |
|---|---|---|
| 4,521,056 A | 6/1985 | Lindenmuth |
| 5,246,269 A | 9/1993 | DeBoer et al. |
| 5,516,194 A | 5/1996 | Maule |
| 5,524,958 A | 6/1996 | Wieczorek et al. |
| 5,673,890 A | 10/1997 | Duesterberg |
| 5,720,514 A | 2/1998 | Carlsen et al. |
| 5,779,302 A | 7/1998 | Geier et al. |
| 5,848,820 A | 12/1998 | Hecht et al. |

(Continued)

FOREIGN PATENT DOCUMENTS

| | | |
|---|---|---|
| DE | 4015872 C1 | 1/1992 |
| DE | 4407724 A1 | 9/1995 |

(Continued)

OTHER PUBLICATIONS

Application No. GB1115050.5, Combined Search and Examination Report dated Dec. 14, 2011.

(Continued)

*Primary Examiner* — Ryan J Walters
*Assistant Examiner* — Matthew P Travers
(74) *Attorney, Agent, or Firm* — MacMillan, Sobanski & Todd, LLC (57) ABSTRACT

A modular armrest has a frame configured to support and retain at least one of a plurality of differently configured modular elements. The modular elements perform various functions and are selected and assembled to the frame from a group of modular elements to form the desired modular armrest.

16 Claims, 5 Drawing Sheets

(56) References Cited

U.S. PATENT DOCUMENTS

| | | | |
|---|---|---|---|
| 5,947,554 | A | 9/1999 | Mashkevich |
| 6,217,112 | B1 | 4/2001 | Linsenmeier et al. |
| 6,508,508 | B1 | 1/2003 | Bargiel |
| 7,080,866 | B2 | 7/2006 | Reisinger et al. |
| 7,114,772 | B2 | 10/2006 | Kobayashi et al. |
| 7,677,656 | B2 | 3/2010 | Saberan et al. |
| 7,748,762 | B2 | 7/2010 | Mayne, Jr. |
| 7,891,719 | B2 | 2/2011 | Carnevali |
| 8,246,109 | B2 * | 8/2012 | Wykoff et al. ........... 296/216.08 |
| 2003/0122392 | A1 | 7/2003 | Larsen et al. |
| 2005/0035618 | A1 | 2/2005 | Toth et al. |
| 2005/0116490 | A1 | 6/2005 | Sitzler et al. |
| 2005/0151398 | A1 | 7/2005 | Sitzler et al. |
| 2005/0252940 | A1 | 11/2005 | Brandstetter et al. |
| 2007/0199196 | A1 * | 8/2007 | Crean .......................... 29/897.2 |
| 2008/0231089 | A1 * | 9/2008 | LaPointe et al. ................ 297/83 |
| 2008/0252111 | A1 | 10/2008 | Rothkop et al. |
| 2009/0174207 | A1 | 7/2009 | Lota |
| 2010/0090490 | A1 * | 4/2010 | Carnevali ................... 296/24.34 |
| 2010/0283277 | A1 | 11/2010 | Carnevali |

FOREIGN PATENT DOCUMENTS

| | | |
|---|---|---|
| DE | 19859204 A1 | 6/2000 |
| DE | 19860031 A1 | 7/2000 |
| DE | 102008032237 A1 | 3/2010 |
| EP | 0593169 B1 | 2/1997 |
| EP | 0860319 A1 | 8/1998 |
| JP | 2010201983 A | 9/2010 |
| WO | 9806599 A1 | 2/1998 |
| WO | 2011142895 A1 | 11/2011 |

OTHER PUBLICATIONS

German Search Report for Application No. 10 2011 083 082.0 dated Nov. 25, 2013.

* cited by examiner

VEHICLE MODULAR ARMREST

CROSS-REFERENCE TO RELATED APPLICATIONS

This application claims the benefit of U.S. Provisional Application Ser. No. 61/387,305, filed Sep. 28, 2010, the disclosure of which is incorporated herein by reference.

BACKGROUND OF THE INVENTION

This invention relates in general to vehicle seats, and in particular to a pivoting modular armrest mounted in a vehicle seat.

Vehicles are equipped with occupant seating systems to provide safety and comfort to passengers. Pivoting armrest assemblies are used in vehicle seating systems to provide enhanced occupant comfort and convenience. These armrest assemblies may include storage compartments, cup holders, and other convenience accessories. These armrest structures are typically custom designed for a specific seating platform. The specific armrest is generally tooled and assembled for each seating platform, thus increasing costs and reducing product flexibility.

It would be desirable to provide an armrest assembly that is designed to be assembled into a variety of configurations from a fixed number of modularized components. It would be further desirable to provide a flexible design capable of different trim installation configurations using the same fixed number of modular components.

SUMMARY OF THE INVENTION

This invention relates to in general to armrest assemblies for seating systems. In particular, this invention relates to a modular armrest that provides a variety of configurations from a limited number of modular convenience elements and a method of producing the modular armrest. The modular armrest includes a frame having spaced-apart side rails and a modular element engaged to the frame. The modular frame element has a coupling element that is configured to engage and retain at least one of a trim element, a bezel element, and a second modular element. In one embodiment, when the modular armrest includes a second modular element, the first modular element may be configured to function as an end cap. The coupling element of the first modular element may be a plurality of fingers disposed along a first edge. The fingers of the first modular element are configured to cooperate with a plurality of fingers disposed along a mating edge of the second modular element. The second modular element is secured to both the first modular element and the side rails of the frame.

A method of forming a modular armrest may include the steps of providing a plurality of frames and a plurality of modular elements. The frames are provided with spaced apart side rails. The frames have at least two different lengths defined by the spaced apart side rails, such that the length of the side rails is configured to establish a frame length. The modular elements have at least two different use configurations. A frame length of the modular armrest is determined, and one of the frames is selected from the plurality of frames having at least two different lengths. At least one of the plurality of modular elements is selected and assembled to the frame.

The method of forming a modular armrest may also include the steps of providing a plurality of paired side rails having at least two different lengths configured to establish a frame length. A plurality of cross members having at least two different lengths is provided. The cross members are configured to space apart the side rails of one of the plurality of paired side rails to establish a frame width. A plurality of modular elements having at least two different lengths configured to generally match the frame width is provided. The frame length and frame width of the modular armrest are determined. The paired side rails and the cross member configured to establish the frame width and frame length are selected. A frame is formed from the selected paired side rails and the cross member. At least one of the modular elements matching the frame width is selected and assembled to the frame.

DETAILED DESCRIPTION OF THE PREFERRED EMBODIMENTS

This invention relates to a modular armrest that can be assembled to provide a variety of different sizes and accessory features from a limited number of modular components. For example, the modular armrest may be formed in different lengths (i.e., short, medium, or long) and widths (i.e., narrow or wide) as well as having different convenience options (e.g., various types of beverage holders, storage compartments, power-supply ports, entertainment devices, and the like). The modular armrest is generally mounted in a vehicle seat assembly, such as a bench seat. The modular armrest, however, may be mounted to another part of the vehicle, such as the vehicle floor, or may be cantilevered and extend from a seat or between two separate seats, such as between two bucket seats. The modular armrest is applicable to front seat assemblies or rear seat assemblies such as, for example, a second or third row bench-style or bucket-style seats.

Figure 1A:
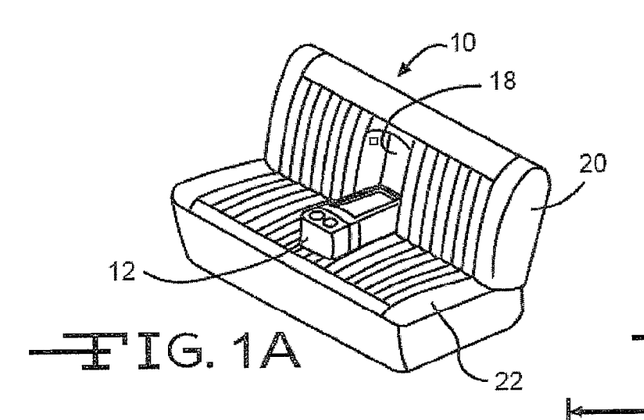
FIG. 1A is a perspective view of a first embodiment of a vehicle seat assembly having a modular armrest, wherein the seat assembly is configured as a bench seat assembly.
Figure 1B:
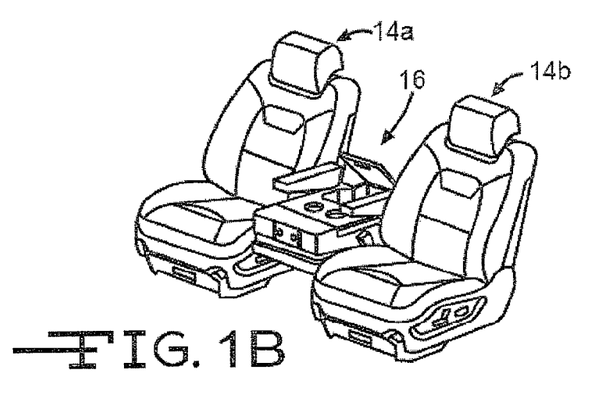
FIG. 1B is a perspective view of a second embodiment of a vehicle seat assembly having a modular armrest, wherein the seat assembly is configured as a pair of bucket seat assemblies located on either side of the modular armrest.

Referring now to FIGS. 1A and 1B, there are illustrated examples of two broad environments of vehicular seats having a modular armrest. FIG. 1A shows a bench-style seat assembly, shown generally at 10, having an embodiment of a modular armrest 12, shown in a use position. FIG. 1B shows spaced-apart, bucket-style seats, shown generally at 14a and 14b, having another embodiment of a modular armrest 16 connecting the bucket seats 14a, 14b together. In an alternative configuration of the bucket-style seating assembly, the modular armrest 16 may be positioned between the seats 14a, 14b but connected to another component, such as a vehicle floor pan (not shown).

In certain embodiments, the modular armrest 12 is configured, for example, to be pivotable between an upright storage position and a lowered use position. In the upright position, the modular armrest 12 may be disposed or housed within a recess 18 of a seat back 20 in the bench-style seat 10 in order to provide a generally flush seat back surface. In the lowered use position, the modular armrest 12 may be supported in a cantilevered manner by a pivoting linkage assembly, as will be described below. Alternatively, the modular armrest may be supported by a seat bottom cushion 22 or another part of the vehicle structure, such as the floor pan tunnel, when the modular armrest 12 is in the lowered horizontal position shown.

Figures 2, 3, 4:
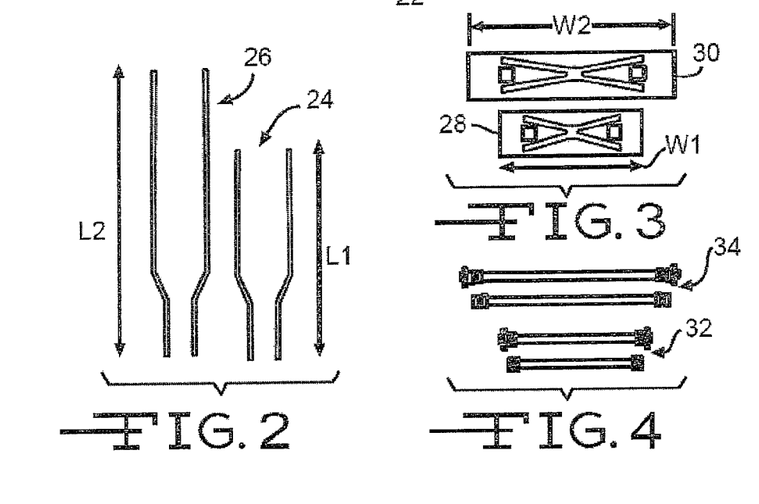
FIG. 2 is an elevational view of two pairs of frame side rails having different length dimensions.
FIG. 3 is an elevational view of two cross members having different length dimensions configured to establish different frame width dimensions.
FIG. 4 is an elevational view of two pairs of hinge elements having different length dimensions.

Referring now to FIG. 2, two pairs of frame side rails, respectively indicated generally at 24 and 26, having different lengths are shown. The first pair of frame side rails 24 are configured to have a first length L1, while the second pair of frame side rails 26 are configured to have a second length L2 which is different (longer in the illustrated embodiment) than the first length L1. The first and second lengths L1 and L2 are adapted to establish different lengths of the modular armrest 12 or 16.

FIG. 3 illustrates two cross members 28 and 30 having different length dimensions W1 and W2. The first cross member 28 has a first length dimension W1, while the second cross member 30 has a second length dimension W2 that is different (longer in the illustrated embodiment) than the length W1. The cross member lengths W1 and W2 are configured to establish a spaced-apart width dimension of the frame side rails 24 and 26 when assembled into a frame assembly, as will be explained below in connection with FIG. 5.

FIG. 4 illustrates two hinge assemblies, respectively indicated generally at 32 and 34, that are configured to provide, for example, a pivotable anchor of the modular armrest 12 to the seat back 20. The hinge assemblies 32, 34 may alternatively be embodied as non-pivoting anchors if so desired. The hinge assembly 32 is configured to have a length sufficient to connect to the frame side rails 24 or 26 that are spaced-apart by the cross member 28. Similarly, the hinge assembly 34 is configured to have a length sufficient to connect to the frame side rails 24 or 26 that are spaced-apart by the cross member 30.

Figure 5:
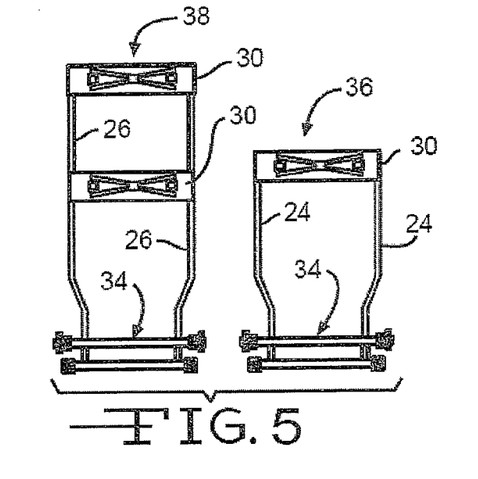
FIG. 5 is an elevational view of two frame assemblies having different length dimensions.

Referring now to FIG. 5, there is illustrated two modular frame assemblies, respectively indicated generally at 36 and 38. The first frame assembly 36 is formed from the two spaced-apart side rails 24 having a length of L1 that establish a first frame length. The two spaced-apart side rails 24 are shown as being attached at a proximal end by the cross member 30 and at a distal end by the hinge assembly 34 to establish a width dimension of W2. The second frame assembly 38 is formed from the two spaced-apart side rails 26 having a length of L2 that establishes a second frame length. As shown in FIG. 5, the first frame length is shorter than the second frame length. The two spaced-apart side rails 26 are attached at a proximal end by cross member 30 and at a distal end by hinge assembly 34 to establish a width dimension of W2. In one embodiment, the hinge assembly 34, for example, is shown to be comprised of two generally parallel and offset rods. One of the rods can function as a pivot axis such that its ends are disposed in openings of the vehicle seat to which the modular armrest is mounted. The ends of the other rod can be disposed in arcuate slots formed in the vehicle seat and function as end stops when the ends abut the ends of the arcuate slots. The cross member(s) 30 and the hinge assembly 34 can be attached to the side rails 24 or 26 by any suitable method such as, for example, by welding, adhesive bonding, screwing, bolting, or riveting. The second frame assembly 38 also is shown having a second cross member 30 attached to the frame rails at a position intermediate the end cross member 30 and the hinge assembly 34, though such is not required. The two cross members 30 are illustrated as being the same, though differently configured cross members may be used if desired.

The modular armrest frame assemblies, such as the first and second frame assemblies 36 and 38, may include some common parts including, for example, pivot rod or hinge assemblies, frame side rails, and cross members. The modular armrest 12, 16 can be configured having different lengths and widths, wherein some of the components are common or shared across the three different styles. As will be described below, the modular armrests 12, 16 may include a foam foundation, foam padding, or other padded elements. The modular armrests 12, 16 may also include a covering material, such as vinyl, leather, or plastic that covers the exposed portions of the foam or other desired portions of the modular armrest.

Figures 6, 7, 8, 9:
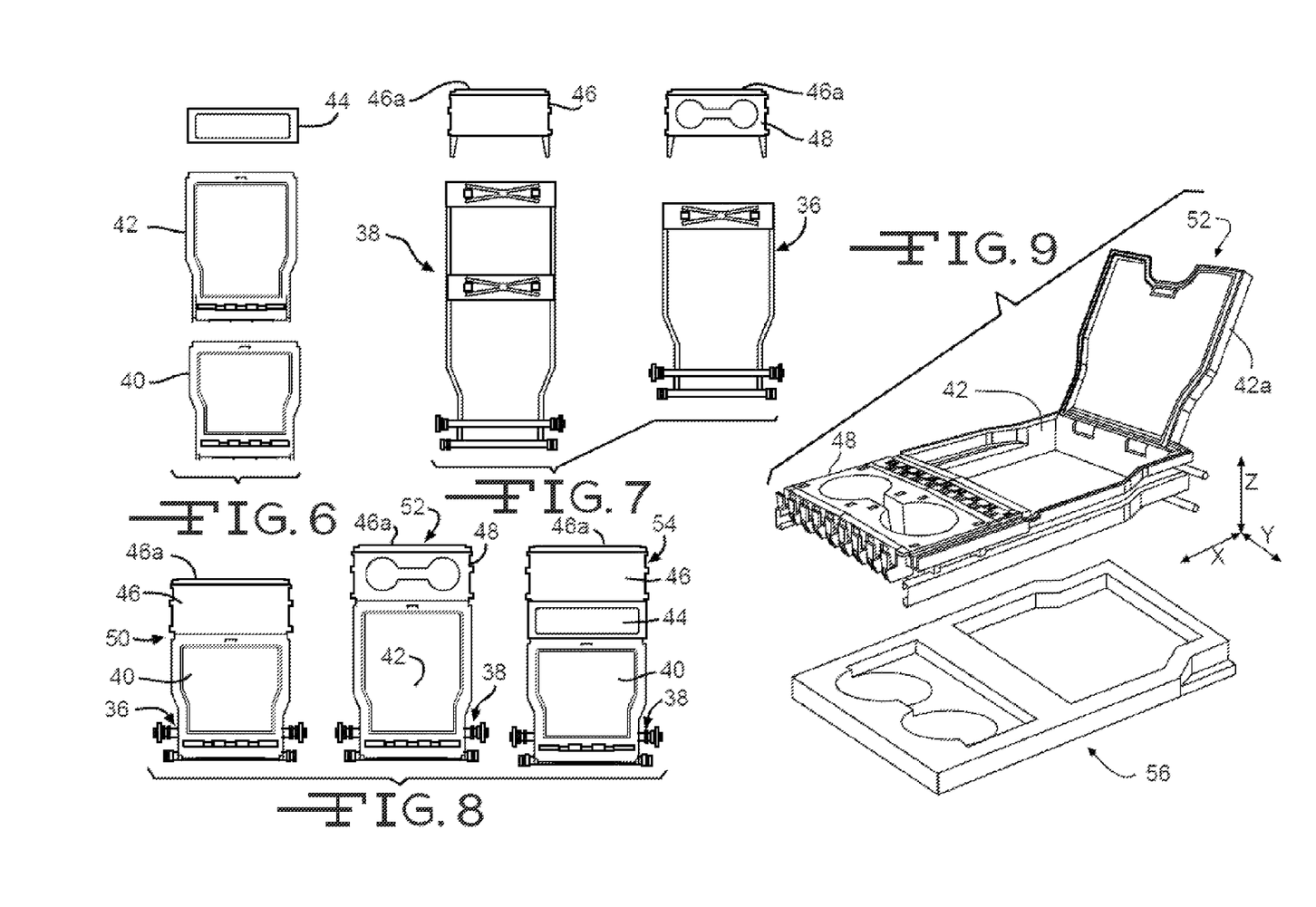
FIG. 6 is an elevational view of a plurality of modular components for an armrest assembly having different use configurations.
FIG. 7 is an exploded view showing an assembly step of modular armrest components mounted to frame assemblies having first and second length dimensions.
FIG. 8 is an elevational view of three different embodiments of modular armrests formed from selected frame assemblies and modular armrest components.
FIG. 9 is a perspective view of an embodiment of a modular armrest assembled onto a foam backing layer.

Referring now to FIG. 6, there are illustrated several examples of modular elements having different use configurations and/or different dimensional characteristics. Modular element 40 is illustrated as a covered storage bin having, for example, a width dimension W2 such that it is configured to be mounted to a frame assembly, such as the frame assemblies 36 and 38, having side rails spaced apart by a width dimension of W2. Alternatively, the modular element 40 may be an armrest cushion, padded or not, having no storage capability. The storage bin 40 is also illustrated having a first length dimension that is a short length dimension of either L1 or shorter. In one embodiment, the storage bin 40 may be the only modular element that forms the modular armrest assembly having a length L1. In another embodiment, the storage bin 40, having a length dimension of L1 or shorter, may be assembled onto the frame assembly 38 having, for example, a length of L2. The storage bin 40 may be connected to other modular elements such as, for example, cup holders, entertainment modules, charging stations, or other use configurations to form a competed armrest assembly having more than one use configured element.

A modular element 42 is likewise illustrated as a covered storage bin, similar to the storage bin 40 but having a second length dimension that is shorter than L2 but longer than L1. As shown in FIG. 9, the covered storage bin 42 may include a lid 42a or other closure to conceal the contents of the storage compartment. The lid 42a may be rigid or flexible and may be as-molded or covered in a covering, such as a vinyl fabric or leather covering. The lid 42a may be pivoted, slid, folded, retracted, or opened in any suitable manner relative to the storage bin 42.

In the illustrated embodiments, both of the modular elements 40 and 42 have a common width dimension of W2. As with the storage bin 40, the storage bin 42 may also be connected to other modular elements having other use configurations to form a completed armrest assembly of length L2. A modular element 44 is illustrated as an entertainment module and may include controls, access connections, and inputs to one or more entertainment accessories in a vehicle, such as, for example, a DVD player, an audio system, a video system, radio transmitter, and/or telephone system. The modular element 44 can also include any type of audio, visual, electronic, gaming, or control device. Additionally, the modular element 44 may include a power supply for charging or operating a separate device. A power supply may also be integrated into the storage bin 40, 42 or modular element 44 so that a device, such as a cell phone, may be placed inside the storage compartment and charged by connection to the power supply or by an electromagnetic field generated in the storage compartment. Alternatively, the modular element 44 may have any use configuration, whether electronic in nature or not, such as, for example, a cup holder, a spacing element, an armrest end cap, or a shallow tray. The modular element 44 is illustrated having a width W2, similar to storage bins 40 and 42, but may be any width compatible with the armrest assembly configuration desired. Additionally, for example, two modular elements 44 may be connected in a side-by-side arrangement where the width dimension becomes the length of the coupled modules when mounted to the frame 36 or 38.

Referring now to FIG. 7 there is illustrated an embodiment of modular elements being assembled onto frames of different lengths. A modular element 46 is illustrated as a use-configured element that may include, for example, one of an entertainment module, a concealed cup holder, or a small storage bin and an end cap modular element 46a. The end cap 46a may be a separate component or integrated with any of the modules described herein. The end cap 46a and the modular element 46 may include other locking structures, as will be described below, to secure and contain other assembled modular elements onto the frame 36 or 38. The end cap 46a provides a finished appearance to the assembled armrest to conceal the functional attachment interfaces associated with other use configured modules. Similarly, a modular element 48 is illustrated as a cup holder and may also include end cap 46a or another use configured element to be assembled onto frame 36 or 38. In another embodiment, the frame assembly 36 or 38 may include an end cap, similar in outward appearance to end cap 46a, as an integrally formed section with the side rails 24 or 26, respectively. In such a configuration, the frame assembly 36 or 38 may be configured as a generally "U"-shaped structure formed, for example, by bending or assembling and welding.

FIG. 8 illustrates several embodiments of modular armrests, respectively indicated generally at 50, 52, and 54, that present the dimensional modularity of a plurality of modular armrests which may be made in accordance with one aspect of the invention. In the illustrated embodiments, the modular armrests may have the same number of common components but where the frames are lengthened to accommodate the desired size of modular elements, such as a larger storage compartment. For example, the first embodiment of the modular armrest 50 includes storage bin 40 and end module 46, 46a assembled onto frame assembly 36. The second embodiment of the modular armrest 52 may have cup holder 48 with end cap 46a and storage bin 42 assembled onto frame 38. Similarly, the third embodiment of the modular armrest 54 may be configured to have storage bin 40, entertainment module 44, and cup holder 46/end cap 46a assembled onto frame 38. According to other embodiments, the frame assemblies may be spaced apart to provide different width modular armrests. Different storage compartment assemblies and beverage holder assemblies may be used and installed onto the frame assemblies.

As shown in FIG. 9, the modular armrest 52, for example, can be assembled onto a foam base, shown generally at 56. The foam base 56 may be a pre-formed element having depressions, reliefs, and cut-outs so as to fit the mating contours of the modular armrest 52. Alternatively, the foam base 56 may be injection-formed around the frame and assembled modular elements of the modular armrest 52. The foam base 56 may also extend beyond the underside of the modular armrest 52 to include covering the sides, front, and/or rear of the armrest. Additionally, any of the modular elements may have foam padding applied to other surfaces, such as the top surface.

Figures 10, 11:
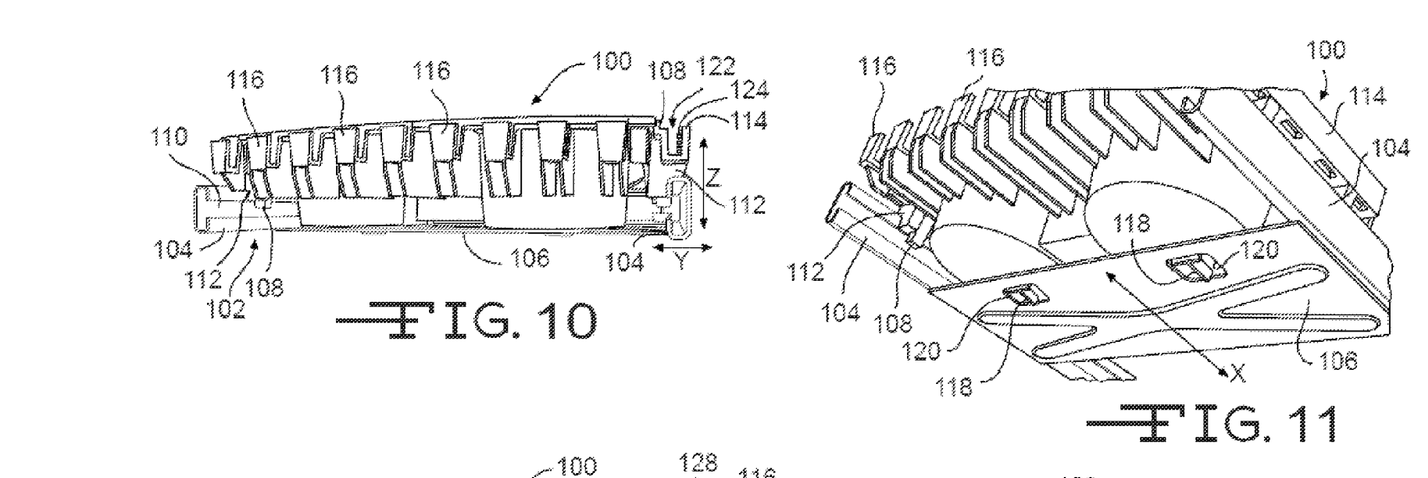
FIG. 10 is an end view of a modular component assembled onto a frame assembly.
FIG. 11 is a perspective view of an underside of the frame and modular component assembly of FIG. 10 showing an embodiment of a locking element.

Referring now to FIGS. 10 and 11, there is illustrated an embodiment of a modular element, shown generally at 100, that is attached to a frame, indicated generally at 102. The frame 102 includes side rails 104 and a cross member 106. The side rails 104 are illustrated as having a generally "C"-shaped cross-section, though any cross sectional shape suitable to orient and retain the modular elements may be used. The side rails 104 may be formed from, for example, metal or plastic sheets that are roll formed and bent to shape. Alternatively, the side rails may be metal or plastic extruded components or may formed from any suitable process. Additionally, the "C"-sections may be extruded and bent or otherwise formed with offsets where a hinge element, such as hinge element 34, is mounted to provide a seat interface region, as shown in FIGS. 2, 5, 7, 8, and 9. The "C"-shaped configuration of the side rail 104 provides strength as well as a suitable mounting point for various components, such as beverage holder assemblies, storage compartment assemblies, and other components.

The modular element 100, shown in FIGS. 10-12A, is illustrated as an open beverage holder. Other types of beverage holders, however, are equally applicable for use with the modular armrest apparatus and the method of manufacture described herein. For example, the modular armrest 12 may include a beverage holder assembly that slides into a housing. The housing can be connected to the frame assembly, such as frame assembly 38, in any suitable manner, such as part of an end cap similar to the mounting configuration of FIG. 7. The beverage holder may be housed within the housing when not in use and simply slid out of the opening to its use position. The beverage holder assembly may include slide members that slide within or relative to the side members of the frame assembly. The slide members may telescope from the "C"-channel sections of the frame 104. The beverage holders may also include bottom support structures that pivot, slide or otherwise move downwardly when the beverage holder is slid out to its use position.

Figure 12A:
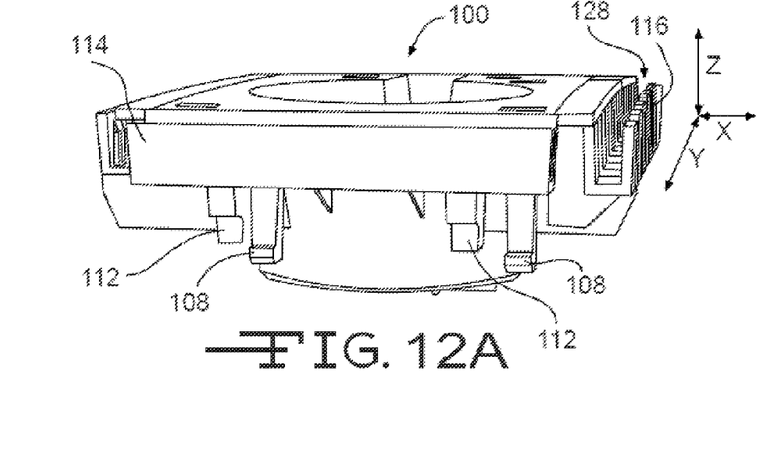
FIG. 12A is a perspective view of an embodiment of a modular component having a plurality of coupling elements.

As shown in FIG. 10, the end view of the modular armrest 12 shows the modular element 100 having at least one frame locking tab 108 that engages a section of the C-section frame rail 104 of an armrest frame to provide at least one of a Y or Z axis retention. The frame locking tab 108 is illustrated as a projection that extends into an open span 110 of the C-section frame rail 104. The upper surface of the C-channel rail 104 locates in a frame channel 112 formed into the modular element. As shown in FIG. 12A, the frame locking tab 108 and the frame channel 112 are positioned under an outer edge grip rail 114. The frame locking tabs 108 and frame channel 112 engage the frame rails 104 to prevent the various modular elements from moving relative to the frame in the "Y" and "Z" directions, as shown in FIG. 10. The frame locking tabs 108 may also engage an inner surface of the C-channel frame side rails to provide added structural rigidity to the assembly.

Disposed along an adjacent edge of the modular element 100 is a plurality of coupling elements, shown as a plurality of fingers 116. The fingers 116 are illustrated as generally "U"-shaped structures that extend from the edge of modular element 100 that is configured to mate with other modular elements, as will be described below. Though illustrated as generally "U"-shaped, the fingers 116 may be any geometry. In an alternative embodiment, the fingers 116 may be configured as solid projections that extend from the abutting edge. Such a finger configuration may include cooperating locking structures, as will be described below, that may be provided on any surfaces of that mate with adjacent fingers or adjacent modules. For example, the mating side surfaces of the fingers may include cooperating projections and recesses that snap-fit together to lock to abutting modular elements together.

Referring now to FIG. 11, the modular element 100, described in the context of a cupholder, is also configured as the end cap of the modular armrest and engages the C-channels with frame locking tabs 108 and frame channels 112 that restrict movement in Y and Z directions. The cupholder 100 further includes "X" direction locking tabs 118 that engage corresponding locking holes 120 formed in the cross member 106. Though shown as being formed in the cross member 106, the locking holes 120 may be formed in another area of the frame, such as the side rail 104. The mating modular end cap may include a projection extending in the "Y" direction that engages the side rail locking hole to prevent movement in the X-direction.

The cross member locking tabs 118 are illustrated as having a "T" shape where the three ends locate against the edges of the locking holes 120 to prevent the cupholder 100 from sliding out of engagement with the frame assembly in the X-direction. Though illustrated as T-shaped, projecting tabs formed on the cupholder bottom, such a configuration is not required. The locking tabs 118 may be formed in any shape, such as a tapered or flat rectangular projection. Alternatively, the tabs 118 may extend from the cross member 106 and engage corresponding recesses or projections in the cupholder bottom and snap into place to retain the structure.

The outer edge grip rail 114 is illustrated as being generally parallel to and positioned above the side rail 104. The outer edge grip rail 114 is shown as a "U"-shaped structure formed having a continuous outer surface, though the grip rail 114 may be formed as discrete fingers similar to the fingers 116. The grip rail 114 forms a channel, indicated generally at 122, that may have trim locking projections 124 extending toward the interior of the channel 122. The projections 124 may be discrete projections or one continuous projection spanning the grip rail length. The outer edge grip rails 114 may extend along the complete length of a modular element or along only a portion thereof. The outer edge grip rails 114 are configured to receive a portion of trim material or an edging strip or bezel to form a finished looking armrest, as will be described below.

Figure 12B:
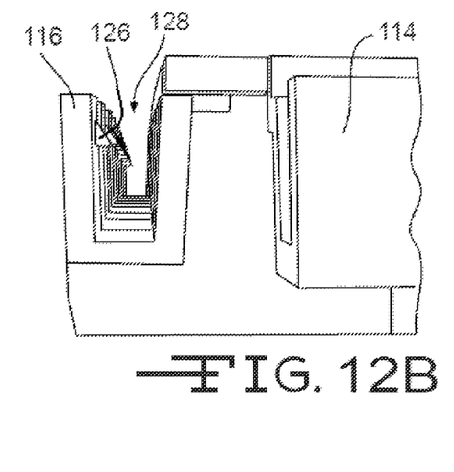
FIG. 12B is an enlarged view of the modular component of FIG. 12A showing the plurality of coupling elements.

Similarly, the fingers 116, as shown in FIG. 12B may also include trim locking projections 126, similar to projections 124. The projections 126 may be provided on each finger 116 and extend into a channel, indicated generally at 128, that is similar to channel 122, though such is not required. The channel 128 formed by the fingers 116 is also configured to receive a portion of trim material or an edging strip or bezel to form a finished looking armrest, as will be described below. Additionally, in other embodiments, the channel 122 may be configured to secure a lighted component, such as an LED rope light, in order to illuminate the elements, illuminate a surface (such as the storage compartment lid surface), or provide decoration. The channel 122 may be provided with an electrical contact or the light component that may be wired separately.

Figure 13A:
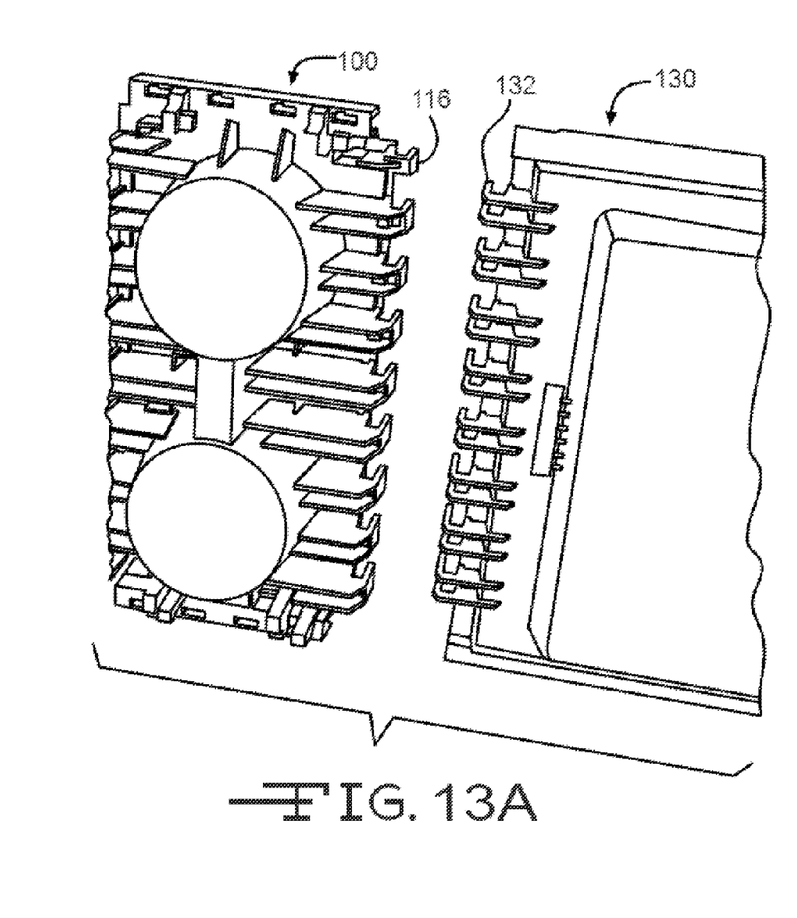
FIG. 13A is an enlarged view of an underside of two unconnected modular components having pluralities of coupling elements.
Figure 13B:
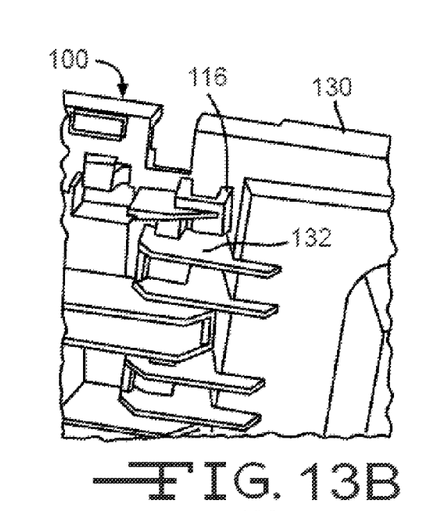
FIG. 13B is an enlarged perspective view of an underside of an embodiment of the two modular components of FIG. 13A that are assembled together without a gap therebetween.
Figure 13C:
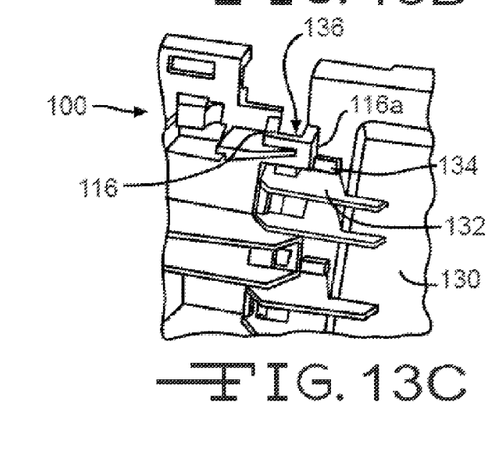
FIG. 13C is an enlarged perspective view of an underside of an embodiment of two modular components of FIG. 13A that are assembled together with a gap.

Referring now to FIG. 13A, two modular elements are shown as cupholder 100 and a storage bin 130. The staggered interface of the fingers may be seen from the bottom side views of FIGS. 13A-C. The fingers 116 of the cupholder 100 are staggered or offset so that they are configured to mate with fingers 132 of the adjacent storage bin 130, as will be described below. As shown in FIG. 13B, the fingers may be nested such that the two adjacent modular elements abut each other closely, leaving no substantial gap therebetween. In the embodiment of FIG. 13C, the fingers may be nested, and an outer surface 116a defined by the fingers 116 of the cupholder 100 contacts a portion of the adjacent storage bin 130, shown as a stop projection 134. The outer surface 116a of fingers 116 contacts the stop projection 134 such that the adjacent modular elements are spaced-apart so that a gap, indicated generally at 136, is formed therebetween. The gap 136 is illustrated as a channel, which may be of any configuration, that is formed by the aligned inner spaces of the fingers 116 of mating modular elements.

Figure 14:
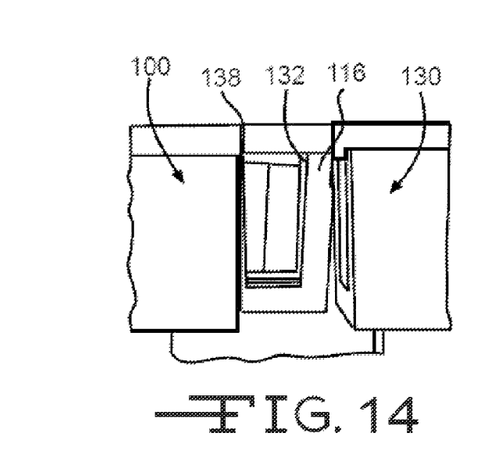
FIG. 14 is an enlarged side view of an embodiment of two connected modular components assembled without a gap therebetween, similar to FIG. 13B.

Referring now to FIGS. 14-19, there are illustrated the various modular element interfaces provided by the connection configurations described herein. The modular elements described in conjunction with the various connection configurations may be any elements, but will be described in the context of modular elements 100 and 130 to illustrate the flexibility of configuring different connections with limited modular elements. FIG. 14 shows modular elements 100 and 130, as described above, connected together without gap 136. The two modular elements 100 and 130 are connected together such that the fingers 116 and 132 are nested together and the adjacent edges of modular elements 100 and 130 abut each other. The connected modular elements 100 and 130 are flush-mounted without the gap 136. This arrangement provides for a generally smooth appearance, with or without a resulting seam 138 at the modular element junction. Such an arrangement may be provided, for example, with modular elements that are formed with as-molded surfaces to provide a generally smooth and uninterrupted appearance.

Figure 15:
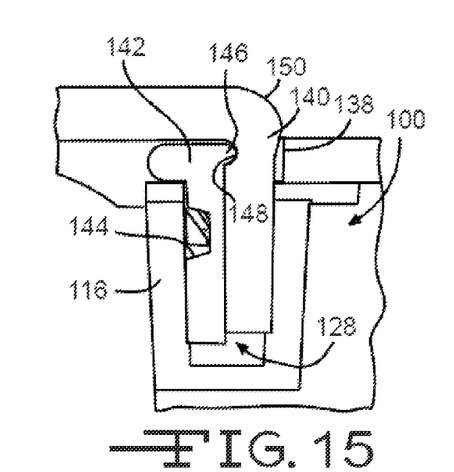
FIG. 15 is an enlarged side view of an embodiment of a trim cover secured to a plurality of coupling elements.

FIG. 15 illustrates modular element 100 as a single module arrangement. The fingers 116 provide a connection having a trim element 140 and a locking pin 142 secured into the channel 128 by the projections 126. Though shown as separate elements, the trim element 140 and the locking pin 142 may be integrally formed together. The locking pin 142 includes a recess 144 that receives the finger projections 126 to couple the trim element 140 and the locking pin 142 to the modular element 100. The locking pin 142 includes a projection 146 that engages a recess 148 in the trim element 140 to secure the trim element 140 to modular element 100. The trim element 140 further includes a bull-nose edge 150 that covers or partially conceals the edge of modular element 100 to provide a plush or more refined appearance. This single module connection may be provided for any single module connection and may be continued to include the outer edge grip rail 114 to provide a continuous roping effect such as may be produced by welting material.

Figure 16:
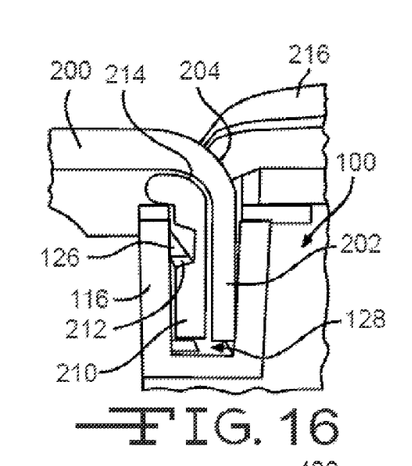
FIG. 16 is an enlarged side view of another embodiment of a trim cover secured to a plurality of coupling elements.

Referring now to FIG. 16, there is illustrated another embodiment of a one module connection, similar to that described in FIG. 15. The connection includes a trim element 200 with a trim leg 202 extending into the channel 128. The trim element 200 may be generally similar to trim element 140, though such is not required. The trim element 200 is illustrated as having a radius edge 204 rather than the projecting bull-nose edge 150 of FIG. 15. A locking pin 210, similar to the locking pin 142, engages the channel 128 and the trim leg 202. The locking pin 210 includes a recess 212, to receive the finger projections 126 of fingers 116, and a radius edge 214, shaped in a manner to form or support the radius edge 204. A bezel 216 is provided to cover the interface of the trim element 200 and the modular element 100. Alternatively, the locking pin 210 and the trim leg 202 may be integrally formed.

Figure 17:
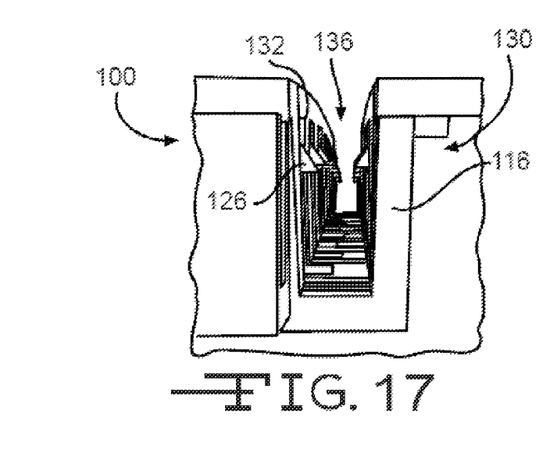
FIG. 17 is an enlarged side view of an embodiment of two connected modular components assembled with a gap therebetween, similar to FIG. 13C.

FIG. 17 is an enlarged and view of the modular element connection of FIG. 13C. This connection forms the modular element interface that is configured to accept the embodiments of trim constructions shown in FIGS. 18 and 19. The illustrated connection includes modular elements 100 and 130. The modular elements 100 and 130 include fingers 116 and 132, respectively. The fingers 116 and 132 include projections 126, though such is not required. The fingers 116 and 132 cooperate, in a nested and offset, arrangement to form the gap, indicated generally at 136.

Figure 18:
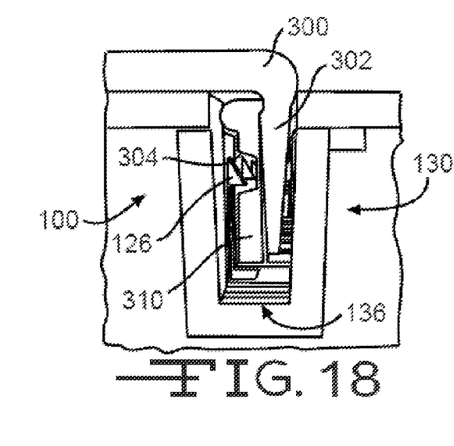
FIG. 18 is an enlarged side view of an embodiment of a trim cover secured to a plurality of spaced-apart coupling elements between two modular components.

Referring now to FIG. 18, there is illustrated an embodiment of a two module connection that includes a trim element 300, similar to trim element 140, arranged to cover modular element 100. The interface of trim element 300 is similar to the embodiment described in the single modular element connection of FIG. 15. Trim element 300 may be a fabric structure, such as cloth, vinyl, leather, and the like, a hard-molded plastic member, or a metal covering. The trim element 300 is illustrated having a trim leg 302 that is tapered, though such is not required. The trim element 300 and modular elements 100 and 130 are secured together by a locking pin 310. The locking pin 310 is illustrated having a recess 304 that mates with finger projections 126 to secure prevent removal of the locking pin. Though shown as being similar to locking pin 140, the locking pin 310 may also be similar to locking pin 210 in order to produce the desired trim element edge effect. The locking pin 310 and trim leg 302 are disposed in the gap 136 formed between two adjoining modular elements 100 and 130. The projections 126 engage the recess 304 to lock the trim element 300 and the modular elements 100 and 130 together. Alternatively, the locking pin 310 and the trim leg 302 may be integrally formed. In another arrangement, the trim leg 302, that extends into the gap 136 may have projection locking recesses 304 on both sides or may have recess 304 on one side and a projection, similar to projection 126, on the opposite side to secure the trim leg 302 and modular elements 100 and 130 together.

Figure 19:
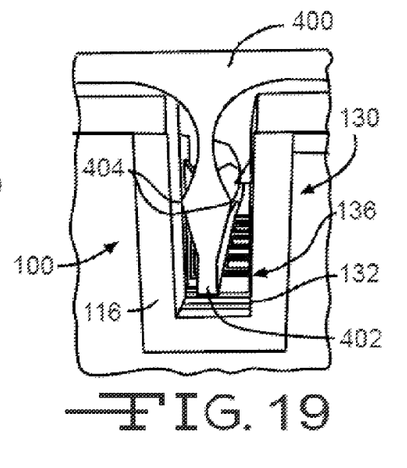
FIG. 19 is an enlarged view of an embodiment of a trim bezel secured to a plurality of spaced-apart coupling elements between two modular components.

Referring now to FIG. 19, an alternative embodiment of a two module connection is shown having a bezel 400 that covers the entire interface between the modular elements 100 and 130. The bezel 400 includes an attachment leg 402 that extends into the gap 136 formed by the nested fingers 116 and 132. The attachment leg 402 is shown having protrusions 404 on both sides to trap the bezel 400 and secure it to the modular elements 100 and 130. The fingers 116 and 132 have projections 126 on each side that engage the attachment leg 402. In one embodiment, the protrusions 404 may be recesses, similar to the recesses described above, to engage the projections 126. The bezel attachment leg 402 extends into the gap 136 to secure the modular elements 100 and 130 together and retain the bezel 400.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A method of forming a modular armrest that is configured to be located adjacent to a seat and positioned to support an arm of an occupant of the seat, the method comprising the steps of:
   a) providing a plurality of frames having spaced apart side rails, the side rails spaced apart by at least one cross member having a retaining feature formed thereon, the plurality of frames having at least two different lengths defined by the spaced apart side rails, the length of the side rails being configured to establish a frame length;
   b) providing a plurality of modular elements having at least two different use configurations and a locking member configured to interact with the cross member;
   c) determining the frame length of the modular armrest and selecting one of the frames having at least two different lengths that establish the frame length;
   d) selecting at least one of the modular elements; and
   e) assembling the modular element to the frame to retain the modular element in a first direction and the locking member engaging the retaining feature of the cross member to retain the modular element in a second direction.

2. The method of claim 1 wherein the step of providing the plurality of frames having spaced apart side rails includes providing the spaced-apart side rails as separate side rail elements and the step of selecting one of the frame and side rails includes the step of forming a frame assembly from the selected one of the frame and the side rails.

3. The method of claim 2 wherein the step of forming a frame assembly includes the step of providing a plurality of cross members having at least two different lengths, the plurality of cross members being configured to space apart the selected side rails that are one of a plurality of paired side rails to establish a frame width, the step of determining the frame length includes determining a frame width, and the step of providing the plurality of modular elements includes providing modular elements that are configured to generally match the determined frame width.

4. The method of claim 1 wherein the step of providing a plurality of frames having spaced apart side rails includes providing the side rails and an end section as an integral component.

5. The method of claim 1 wherein the step of providing a plurality of modular elements includes providing modular elements having frame mounting sections that are configured to engage the channel sections of the spaced-apart side rails and the step of assembling the modular element to the frame includes assembling the modular elements to the frame by engaging the frame mounting sections to a portion of the channel sections of the side frames.

6. The method of claim 1 wherein the channel sections of the side rails are generally C-shaped channel sections.

7. A method of forming a modular armrest that is configured to be located adjacent to a seat and positioned to support an arm of an occupant of the seat, the method comprising the steps of:
   a) providing a plurality of paired side rails, each having a cross sectional shape configured to position a modular element, the plurality of paired side rails having at least two different lengths configured to establish a frame length;
   b) providing a plurality of cross members having at least two different lengths, the plurality of cross members configured to space apart the side rails of one of the plurality of paired side rails to establish a frame width;
   c) providing a plurality of modular elements having at least two different use configurations and being configured to generally match the frame width, the plurality of modular elements having mounting surfaces configured to be retained by the cross sectional shape of the side rails in a first direction and a locking member that is configured to engage one of a hole or a detent of one of the plurality of cross members to retain the modular element in a second direction, and at least one of the modular elements defining an armrest surface;
   d) determining the frame length and frame width of the modular armrest and selecting the paired side rails and the cross member configured to establish the frame width and frame length;
   e) forming a frame from the selected paired side rails and the cross member having the frame width and frame lengths and selecting at least one of the modular elements matching the frame width; and
   f) assembling the modular element to the frame.

8. The method of claim 7 wherein step c) includes providing the plurality of modular elements as modular elements configured to provide one of a plurality of functions and step f) includes selecting the modular element configured to provide one of the plurality of functions.

9. The method of claim 8 wherein the step of providing the plurality of modular elements as modular elements configured to provide one of a plurality of functions in step c) includes providing a first modular element configured to provide a first function and a second modular element configured to perform a second function that is different from the first function where both the first and second modular elements have the same length, and further includes that at least one of the modular elements has a retaining feature that is configured to cooperate with one of the plurality of cross members to retain the modular element in a second direction, and step e) further including selecting the second modular element and step f) includes assembling the first and second modular elements to the frame such that the modular elements are retained in the first and second directions.

10. The method of claim 8 wherein
   step a) further includes providing the two different lengths of the plurality of paired side rails to establish the frame length as one of a first frame length and a second frame length such that the first frame length is longer than the second frame length; and wherein
   step b) further includes providing the two different lengths of the plurality of cross members to establish the frame width as one of a first frame width and a second frame width such that the first frame width is larger than the second frame width; and wherein
   step d) includes determining which of the first and second frame lengths and the first and second frame widths will form the modular armrest and selecting the appropriate paired side rails and cross member to form the frame.

11. A method of forming a combined vehicle seat and modular armrest assembly comprising the steps of:
   a) providing a plurality of frames having spaced apart side rails, each having a cross section and spaced apart by at least one cross member, the plurality of frames having at least two different lengths defined by the spaced apart side rails, the length of the side rails being configured to establish a frame length;
   b) providing a plurality of modular elements having at least two different use configurations, wherein the modular elements have mounting surfaces configured to be retained by the cross sections of the side rails in a first direction and at least one locking member that interacts with the at least one cross member;
   c) determining the frame length of the modular armrest and selecting one of the frames having at least two different lengths that establish the frame length;
   d) selecting at least one of the modular elements;
   e) assembling the modular element to the frame wherein the locking member engages one of a hole and a detent formed in the cross member to retain the modular element in a second direction to form a modular armrest; and
   f) securing the modular armrest to a vehicle seat to provide a combined vehicle seat and modular armrest assembly wherein the modular armrest is positioned to support an arm of an occupant of the seat.

12. The method of claim 11 wherein step f) is performed by pivotably securing the modular armrest to a vehicle seat for movement between a storage position and a use position.

13. The method of claim 12 wherein the modular armrest is pivotable between an upright storage position and a lowered use position.

14. The method of claim 12 wherein step f) is performed by pivotably securing the modular armrest to a bench-style vehicle seat assembly having a seat back and a seat bottom.

15. The method of claim 14 wherein the modular armrest is pivotable between an upright storage position, in which the modular armrest is received within a recess provided in the seat back, and a lowered use position, in which the modular armrest is disposed adjacent to the seat bottom.

16. The method of claim 12 wherein step f) is performed by pivotably securing the modular armrest to a pair of bucket-style seats.

* * * * *